(12) United States Patent
Goto

(10) Patent No.: US 7,101,625 B2
(45) Date of Patent: *Sep. 5, 2006

(54) GLASS FOR A LIGHT FILTER AND A LIGHT FILTER

(75) Inventor: Naoyuki Goto, Machida (JP)

(73) Assignee: Kabushiki Kaisha Ohara, Kanagawa-Ken (JP)

( * ) Notice: Subject to any disclaimer, the term of this patent is extended or adjusted under 35 U.S.C. 154(b) by 134 days.

This patent is subject to a terminal disclaimer.

(21) Appl. No.: 10/834,582

(22) Filed: Apr. 28, 2004

(65) Prior Publication Data

US 2004/0202869 A1 Oct. 14, 2004

Related U.S. Application Data

(63) Continuation-in-part of application No. 09/975,332, filed on Oct. 10, 2001, which is a continuation-in-part of application No. 09/550,879, filed on Apr. 17, 2000, now Pat. No. 6,461,733.

(30) Foreign Application Priority Data

Aug. 30, 1999 (JP) ................................. 11-242973

(51) Int. Cl.
*B32B 9/00* (2006.01)

(52) U.S. Cl. ...................... 428/428; 428/432; 428/689; 428/699; 428/701; 428/702; 501/68; 501/69

(58) Field of Classification Search ................ 428/428, 428/432, 689, 699, 701, 702; 501/55, 68, 501/69, 72

See application file for complete search history.

(56) References Cited

U.S. PATENT DOCUMENTS 4,390,638 A * 6/1983 Mennemann et al. ......... 501/77
5,719,989 A * 2/1998 Cushing ...................... 359/589
6,461,733 B1 * 10/2002 Goto ........................... 428/426

* cited by examiner

*Primary Examiner*—Stephen Stein
*Assistant Examiner*—G. Blackwell
(74) *Attorney, Agent, or Firm*—Hedman & Costigan

(57) ABSTRACT

Glass for a light filter capable of preventing variation of refractive index in a band-pass filter has a coefficient of thermal expansion within a range from $90 \times 10^{-7}/°C$. to $120 \times 10^{-7}/°C$. within a temperature range from $-20°C$. to $+70°C$. and, preferably, Young's modulus of 75 GPa or over and Vickers hardness of 550 or over, and light transmittance for plate thickness of 10 mm of 90% or over within a wavelength range from 950 nm to 1600 nm.

17 Claims, No Drawings

GLASS FOR A LIGHT FILTER AND A LIGHT FILTER

RELATED PATENT APPLICATION

This application is a continuation-in-part of our prior application U.S. Ser. No. 09/975,332 filed Oct. 10, 2001 which is a continuation-in-part of our prior application U.S. Ser. No. 09/550,879 filed Apr. 17, 2000, now U.S. Pat. No. 6,461,733.

BACKGROUND OF THE INVENTION

This invention relates to glass for a light filter and also to a light filter using glass There are light filters which cut or pass light of a specific wavelength and there are also light filters which reduce intensity of light without depending upon wavelength. The former includes a band-pass filter which passes only a specific wavelength, a notch pass filter which cuts a specific wavelength and high-pass and low-pass filters which pass only wavelengths shorter or longer than a specific wavelength. The latter includes an ND filter.

Light filters can be classified also into an absorption type filter and an interference type filter. A representative absorption type filter is the ND filter and a representative interference type filter is the band-pass filter. A substrate made of plastic is used for absorption type filters such as those for photography. Since a substrate for light filters which are subject to a strong laser beam requires durability and heat resistance property, amorphous glass is exclusively employed for such substrate.

The band-pass filters are made by forming, on a substrate made of, e.g., glass, a multi-layer film of dielectric by alternately laminating an H layer of a dielectric thin film having a high refractive index and an L layer of a dielectric thin film having a low refractive index.

In a band-pass filter which is used for the WDM (wavelength division multiplexing) optical communication system, temperature stability of the center wavelength of the band poses a problem when a narrow band width for passing wavelengths is set for applying the band-pass filter to a wavelength of a higher density. More specifically, the band-pass filter is a sensitive element in which the center frequency of the band varies even with a slight variation in temperature and, therefore, temperature compensation should be made by a temperature controller when the band-pass filter is used. Such temperature controller, however, cannot actually be employed because of limitation in the space where the band-pass filter is located. The temperature stability has become a matter of increasing importance since it is necessary to reduce the band width as the amount of light information increases.

In the past, amorphous glass has been used as a substrate for the band-pass filter. This prior art substrate is not sufficient in its compressive stress to the film and its durability since its thermal expansion property and mechanical strength are not sufficiently high. Further, amorphous glass has a low surface hardness. Thus, amorphous glass cannot sufficiently satisfy the demands for a substrate for a light filter, particularly a substrate for a band-pass filter.

It is, therefore, an object of the invention to provide a material suitable for a substrate for a light filter which has eliminated the above described disadvantages of the prior art substrate and has a thermal expansion property which is sufficient for avoiding variation in the refractive index at a temperature at which a filter formed with a mono-layer or multi-layer film is used (i.e., having a high coefficient of thermal expansion and thereby imparting compressive stress to the film to improve temperature stability of the refractive index of the film) and also has a mechanical property which imparts sufficient durability to the filter and further has excellent light transmittance.

It is, another object of the invention to provide a light filter made of such substrate.

SUMMARY OF THE INVENTION

Accumulated studies and experiments made by the inventors of the present invention for achieving the above described objects of the invention have resulted in the finding, which has led to the present invention, that glass having a coefficient of thermal expansion, mechanical strength and light transmittance within specific ranges is suitable for achieving these objects of the invention.

According to the invention, there is provided glass for a light filter having a coefficient of thermal expansion within a range from $90 \times 10^{-7}/°$ C. to $120 \times 10^{-7}/°$ C. within a temperature range from $-20°$ C. to $+70°$ C.(.) and having a composition which comprises, in weight percent:

one or more ingredients selected from the group consisting of $SiO_2$, $B_2O_3$ and $P_2O_5$ in the total amount of 35–55%, wherein the upper limit of $SiO_2$ is 41.5%;

one or more ingredients selected from the group consisting of $TiO_2$, $La_2O_3$, $ZrO_2$, $Nb_2O_5$, $Ta_2O_5$, $WO_3$ and $Y_2O_3$ in the total amount of 20–45% wherein $TiO_2$ is included within a range from 0 to 30% and $ZrO_2$ is included within a range from 0 to 5%;

one or more ingredients selected from the group consisting of MgO, CaO, SrO, BaO and ZnO in the total amount of 3% or more and less than 15%;

$Na_2O$ within a range from 0 to 14.5%; and one or both of $Sb_2O_3$ and $As_2O_3$ in the total amount of 0–1%, said glass being substantially free of $Al_2O_3$, CdO and PbO.

In one aspect of the invention, there is provided glass for a light filter having a coefficient of thermal expansion within a range from $90 \times 10^{-7}/°$ C. to $120 \times 10^{-7}/°$ C. within a temperature range from $-20°$ C. to $+70°$ C.(.) and having a composition which comprises, in weight percent:

one or more ingredients selected from the group consisting of $SiO_2$, $B_2O_3$ and $P_2O_5$ in the total amount of 35–55%, wherein the upper limit of $SiO_2$ is 41.5%;

$TiO_2$ within a range from 0 to 30%;

$ZrO_2$ within a range from 0 to 5%;

one or more ingredients selected from the group consisting of MgO, CaO, SrO, BaO and ZnO in the total amount of 3% or more and less than 15%;

one or more ingredients selected from the group consisting of $Li_2O$, $Na_2O$ and $K_2O$ in the total amount of 5–30%, wherein $Na_2O$ is included within a range from 0 to 14.5% and one or both of $Sb_2O_3$ and $As_2O_3$ in the total amount of 0-1%, said glass being substantially free of $Al_2O_3$, CdO and PbO.

In another aspect of the invention, there is provided glass for a light filter having a coefficient of thermal expansion within a range from $90 \times 10^{-7}/°$ C. to $120 \times 10^{-7}/°$ C. within a temperature range from $-20°$ C. to $+70°$ C. (.) and having a composition which comprises, in weight percent:

one or more ingredients selected from the group consisting of $SiO_2$, $B_2O_3$ and $P_2O_5$ in the total amount of 35–55%, wherein the upper limit of $SiO_2$ is 41.5%;

one or more ingredients selected from the group consisting of $TiO_2$, $La_2O_3$, $ZrO_2$, $Nb_2O_5$, $Ta_2O_5$, $WO_3$ and $Y_2O_3$ in the total amount of 20–45% wherein $TiO_2$ is included within a range from 0 to 30%;

one or more ingredients selected from the group consisting of MgO, CaO, SrO, BaO and ZnO in the total amount of 3% or more and less than 15%;

one or more ingredients selected from the group consisting of $Li_2O$, $Na_2O$ and $K_2O$ in the total amount of 5–30%, wherein $Na_2O$ is included within a range from 0 to 14.5%; and one or both of $Sb_2O_3$ and $As_2O_3$ in the total amount of 0–1%.

In another aspect of the invention, the glass has Young's modulus of 75 GPa or over.

In another aspect of the invention, the glass has Vickers hardness of 550 or over.

In another aspect of the invention, light transmittance for plate thickness of 10 mm is 90% or over within a wavelength range from 950 nm to 1600 nm.

In another aspect of the invention, there is provided a light filter which is made by forming a dielectric film on the above described glass.

In still another aspect of the invention, there is provided a light filter which is made by forming a dielectric film on glass having a larger coefficient of thermal expansion than dielectric which constitutes the dielectric film.

DETAILED DESCRIPTION OF THE INVENTION

Reasons for limiting the thermal expansion property, Young's modulus, Vickers hardness, light transmittance and composition of the glass for a light filter according to the invention will be described below. The composition of the glass is expressed on the oxide basis (in weight percent).

Description will be made first about thermal expansion property. As described previously, the temperature stability of the center wavelength of the band is very important and glass-ceramics having a larger coefficient of thermal expansion than a material which constitutes the film is required. The studies and experiments conducted by the inventors of the present invention have resulted in the finding that, if the coefficient of thermal expansion within the temperature range from $-20°$ C. to $+70°$ C. is $90\times10^{-7}/°$ C. or over, sufficient compression stress can be imparted to the film within a temperature range in which the glass is used as a band-pass filter and that, if the coefficient of thermal expansion exceeds $120\times10^{-7}/°$ C., difference in the coefficient of thermal expansion between the substrate and the filter becomes so large that problems such as separation of the film from the substrate take place. A preferable range of the coefficient of thermal expansion is $95\times10^{-7}/°$ C. to $115\times10^{-7}/°$ C. and a more preferable range thereof is $105\pm5\times10^{-7}/°$ C.

In the band-pass filter, the temperature stability of the center wavelength depends to some extent on a refractive index temperature coefficient of a dielectric which constitutes the thin film and, to a larger extent than that, on a coefficient of thermal expansion of the substrate. This is because refractive index is determined by a film atomic density of the thin film. That is, the higher the film atomic density of the thin film is, the smaller becomes variation caused by the temperature of the center frequency. The film atomic density of the thin film is greatly influenced by the coefficient of thermal expansion of the substrate for the light filter on which the thin film is formed. More specifically, the temperature of the substrate during the film forming process becomes about 200° C. and the substrate thereby is considerably expanded. The thin film is formed on this expanded substrate and, as the substrate is cooled, the thin film is subjected to compressive stress due to difference in the coefficient of thermal expansion between them. As a result, the film atomic density of the thin film increases and the refractive index thereby increases. As the coefficient of thermal expansion of the substrate increases, the compressive stress applied to the dielectric thin film formed on the substrate increases with the result that variation in the refractive index due to temperature at which the filter is used decreases. For this reason, it is desirable to set the coefficient of thermal expansion of the glass at a larger value than the coefficient of thermal expansion of the dielectric thin film.

Having regard to severe conditions in which the band-pass filter is used, strength against mechanical deformation, i.e., Young's modulus and Vickers hardness of the glass, in addition to the above described properties, cannot be ignored.

As regards Young's modulus, since the substrate is processed to a small chip (2 mm×2 mm×2 mm or below) after forming of a thin film, a high Young's modulus and a high strength are required for the substrate. Having regard to such subsequent processing, the glass should preferably have Young's modulus of 75 GPa or over and Vickers hardness of 550 or over.

As regards light transmittance, if light transmittance is low, inconveniences such as reduction in the signal-to-noise ratio will take place in producing signals. It is therefore desirable that light transmittance should be as large as possible and it has been found that light transmittance of 90% at the minimum is necessary. The wavelength range used for the band-pass filter is 950 nm to 1600 nm and light transmittance of 90% or over for plate thickness of 10 mm is required for this wavelength range. As to light transmittance within this wavelength range, light transmittance should preferably be 93% or over and, more preferably, 95% or over.

Reasons for limiting the composition range of the base glass as described above will now be described.

The $SiO_2$, $B_2O_3$ and $P_2O_5$— ingredients are glass forming ingredients. If the total amount of one or more of these ingredients is below 35%, chemical durability of the glass deteriorates and Young's modulus and Vickers hardness decrease whereas if the total amount of these ingredient exceeds 55%, difficulty arises in melting and forming the base glass and, moreover, high thermal expansion property of the glass cannot be achieved.

The $TiO_2$, $La_2O_3$, $ZrO_2$, $Nb_2O_5$, $Ta_2O_5$, $WO_3$ and $Y_2O_3$ ingredients are important ingredients which can impart high thermal expansion property, high Young's modulus and high Vickers hardness to the glass containing a relatively large amount of alkali ingredients (i.e., Li, Na and K). If the total amount of one or more of these ingredients is below 20%, these effects cannot be obtained whereas if the total amount exceeds 45%, difficulty arises in melting and forming of the glass and resistance to devitrification during forming of the glass deteriorates.

The $Li_2O$, $Na_2O$ and $K_2O$ ingredients are effective for improving the melting property of the glass and increasing high thermal expansion property while maintaining high Young's modulus. If the total amount of one or more of these ingredients is below 5%, these effects cannot be achieved whereas if the total amount exceeds 30%, chemical durability as well as Young's modulus and Vickers hardness deteriorate.

The MgO, ZnO, CaO, BaO and SrO ingredients are effective for improving the melting property of the glass and increasing high thermal expansion property while maintaining high Young's modulus. If the total amount of one or more of these ingredients is below 3%, these effects cannot be achieved whereas if the total amount is 15% or over, the melting and forming property of the glass deteriorate.

The $Sb_2O_3$ and $As_2O_3$ ingredients may be added as a refining agent in melting the glass. Addition of the total sum of one or both of these ingredients up to 1% will suffice. A preferable total sum is 0.5% or less.

To such an extent as not to impair the required properties of the glass, SnO, CuO, CoO, NiO, $Fe_2O_3$, CeO and/or MnO may be added up to 5%.

As to PbO, this ingredient is undesirable from the standpoint of protecting the environment and use of this ingredient should be avoided to the maximum extent possible.

For manufacturing the glass for a light filter according to the invention, the base glass having the above described composition is melted and formed to a predetermined shape and, annealed if necessary. By lapping and polishing the glass thus obtained by a conventional method, glass for a light filter having surface roughness (Ra) (arithmetic mean roughness) within a range from 1.0 Å to 5.0 Å is provided.

The glass according to the invention is suitable for an interference type light filter in which a multi-layer film of dielectric is formed on a glass substrate, particularly, for a band-pass filter having a dielectric multi-layer film formed by alternately laminating a dielectric thin film (H layer) having a high refractive index and a dielectric thin film (L layer) having a low refractive index.

As the dielectric, inorganic oxides such as $TiO_2$, $Ta_2O_2$, $Nb_2O_5$ and $SiO_2$ may preferably be used. In a band-pass filter used for the wavelength range from 950 nm to 1600 nm, combinations of $TiO_2/SiO_2$, $Ta_2O_2/SiO_2$ and $Nb_2O_5/SiO_2$ may preferably be used as combinations of the H layer and the L layer.

The light filter of the present invention can be provided by forming a dielectric thin film on the surface of the glass substrate. For forming the thin film, deposition, RF ion plating, magnetron spattering, plasma ion plating etc. may be employed. Among them, deposition is particularly preferable.

EXAMPLES

Examples of the invention will now be described. Tables 1, 2 and 3 show Examples No. 1 to No. 8 of the glass for a light filter according to the invention and a comparative example of a prior art glass substrate for a light filter with respect to their composition, coefficient of thermal expansion, Young's modulus, Vickers hardness and light transmittance.

TABLE 1

| | Examples | | |
|---|---|---|---|
| | 1 | 2 | 3 |
| $SiO_2$ | 41.39 | 39.39 | 41.39 (Wt. %) |
| $B_2O_3$ | | 2.00 | |
| $P_2O_5$ | | | |
| $La_2O_3$ | | | |

TABLE 1-continued

| | Examples | | |
|---|---|---|---|
| | 1 | 2 | 3 |
| $TiO_2$ | 30.00 | 30.00 | 26.00 |
| $ZrO_2$ | | | 2.10 |
| $Nb_2O_5$ | | | |
| $Ta_2O_5$ | | | |
| $WO_3$ | | | |
| $Y_2O_3$ | | | 4.00 |
| MgO | | | 0.5 |
| ZnO | | | |
| BaO | 3.50 | 3.50 | 2.50 |
| SrO | | | 0.5 |
| $Li_2O$ | 2.00 | 2.00 | 2.00 |
| $Na_2O$ | 14.10 | 14.10 | 13.00 |
| $K_2O$ | 9.00 | 9.00 | 8.00 |
| $Sb_2O_3$ | 0.01 | 0.01 | |
| $As_2O_3$ | | | |
| Coefficient of thermal expansion ($\times 10^{-7}/°$ C.) ($-20°$ C. to $+70°$ C.) | 110 | 100 | 115 |
| Young's modulus (GPa) | 85 | 87 | 114 |
| Vickers hardness (Hv) | 550 | 580 | 640 |
| Light transmittance (%) (950–1600 nm) | 99 | 99 | 97 |

TABLE 2

| | Examples | | |
|---|---|---|---|
| | 4 | 5 | 6 |
| $SiO_2$ | 17.10 | 20.00 | 28.60 (Wt. %) |
| $B_2O_3$ | 21.50 | 10.00 | 10.00 |
| $P_2O_5$ | | 8.60 | |
| $La_2O_3$ | 17.00 | 12.00 | 10.00 |
| $TiO_2$ | 7.60 | 5.00 | 7.60 |
| $ZrO_2$ | 4.50 | 4.50 | 4.50 |
| $Nb_2O_5$ | 7.90 | 7.90 | 7.90 |
| $Ta_2O_5$ | | | 7.00 |
| $WO_3$ | | 2.60 | |
| $Y_2O_3$ | | 5.00 | |
| MgO | 1.00 | 1.00 | 1.00 |
| ZnO | | 1.00 | |
| BaO | | 2.00 | 10.00 |
| SrO | 14.80 | 11.80 | 4.80 |
| $Li_2O$ | 8.50 | 8.50 | 8.50 |
| $Na_2O$ | | | |
| $K_2O$ | | | |
| $Sb_2O_3$ | 0.10 | | 0.10 |
| $As_2O_3$ | | 0.10 | |
| Coefficient of thermal expansion ($\times 10^{-7}/$C.) ($-20°$ C. to $+70°$ C.) | 90 | 95 | 96 |
| Young's modulus (GPa) | 117 | 110 | 120 |
| Vickers hardness (Hv) | 680 | 630 | 670 |
| Light transmittance (%) (950–1600 nm) | 97 | 96 | 96 |

TABLE 3

| | Examples | | Comparative |
|---|---|---|---|
| | 7 | 8 | Example 1 |
| $SiO_2$ | 20.00 | 40.00 | 47.00 (Wt. %) |
| $B_2O_3$ | 10.00 | | 7.10 |
| $P_2O_5$ | 8.60 | 1.39 | |
| $La_2O_3$ | 15.00 | | |
| $TiO_2$ | 7.60 | 25.00 | |
| $ZrO_2$ | 4.50 | 5.00 | |

TABLE 3-continued

|  | Examples | | Comparative |
| --- | --- | --- | --- |
|  | 7 | 8 | Example 1 |
| $Nb_2O_5$ | 7.90 | | |
| $Ta_2O_5$ | | | |
| $WO_3$ | | 2.00 | |
| $Y_2O_3$ | | | |
| MgO | 1.00 | | PbO = 9.70 |
| ZnO | 2.00 | 0.50 | 6.10 |
| BaO | 2.00 | 2.00 | 10.00 |
| SrO | 10.80 | 1.00 | |
| $Li_2O$ | 8.50 | 4.00 | |
| $Na_2O$ | | 12.10 | 6.00 |
| $K_2O$ | | 9.00 | 14.00 |
| $Sb_2O_3$ | 0.10 | 0.01 | 0.10 |
| $As_2O_3$ | | | |
| Coefficient of thermal expansion ($\times 10^{-7}/°$ C.) (−20° C. to +70° C.) | 95 | 110 | 88 |
| Young's modulus (GPa) | 120 | 85 | 70 |
| Vickers hardness (Hv) | 680 | 550 | 480 |
| Light transmittance (%) (950–1600 nm) | 97 | 99 | 99 |

For manufacturing the glass of the above described Examples No. 1 to No. 8, materials including oxides, carbonates and nitrates were weighed and mixed and molten in a conventional melting apparatus at a temperature within the range from about 1250° C. to 1350° C. The molten glass was stirred to homogenize it and thereafter formed into a predetermined shape and annealed to provide a formed glass. Then, the formed glass was lapped with diamond pellets of 800–2000# for 5 minutes to 30 minutes and was finally polished with cerium oxide polishing grains having an average diameter of 0.02 μm to 3 μm for 30 minutes to 60 minutes. Surface roughness (Ra) (roughness at the center line) was 5 Å or below.

Comparing Examples No. 1 to No. 8 with Comparative Example 1, the coefficient of thermal expansion of the prior art glass substrate for a light filter was $88 \times 10^{-7}/°$ C. which was not sufficient for imparting compressive stress to a formed film. The prior art glass substrate exhibited also low Young's modulus of 70 GPa and Vickers hardness of 480. In contrast, the glass of the present invention had a sufficient coefficient of thermal expansion for imparting compressive stress to the formed film and also sufficient Young's modulus and Vickers hardness which shows that the glass of the present invention is suitable for a substrate for a light filter.

Interference type light filters which were provided by forming multi-layer films of $TiO_2/SiO_2$, $Ta_2O_5/SiO_2$ and $Nb_2O_5/SiO_2$ on the glass substrates of the above described Examples had an excellent temperature stability of its center wavelength and were found to be most suitable for a band-pass filter for optical communication.

As described in the foregoing, according to the invention, the disadvantages of the prior art substrates are overcome and glass substrates for a light filter having an excellent temperature stability of a center wavelength are provided. These features, i.e., high light transmittance, high thermal expansion property, high Young's modulus and high Vickers hardness, are suitable for an interference type filter, particularly a band-pass filter and are most suitable for WDM and DWDM (density wavelength division multiplexing) in optical communication systems. Further, the band-pass filter elements which are provided by forming multi-layer dielectric films of $TiO_2/SiO_2$, $Ta_2O_5/SiO_2$ and $Nb_2O_5/SiO_2$ on the glass substrates of the invention have an excellent temperature stability of the center wavelength and can be used not only for optical communication systems on the ground but also for space-based satellites.

What is claimed is:

1. Glass for a light filter having a coefficient of thermal expansion within a range from $90 \times 10^{-7}/□$ to $120 \times 10^{-7}/°$ C. within a temperature range from −20° C. to +70° C. (.) and having a composition which comprises, in weight percent:
    one or more ingredients selected from the group consisting of $SiO_2$, $B_2O_3$ and $P_2O_5$ in the total amount of 35–55%, wherein the upper limit of $SiO_2$ is 41.5%;
    one or more ingredients selected from the group consisting of $TiO_2$, $La_2O_3$, $ZrO_2$, $Nb_2O_5$, $Ta_2O_5$, $WO_3$ and $Y_2O_3$ in the total amount of 20–45%, wherein $TiO_2$ is included within a range from 0 to 30% and $ZrO_2$ is inclucded within a range from 0 to 5%;
    one or more ingredients selected from the group consisting of MgO, CaO, SrO, BaO and ZnO in the total amount of 3% or more and less than 15%;
    $Na_2O$ within a range from 0 to 14.5%; and
    one or both of $Sb_2O_3$ and $As_2O_3$ in the total amount of 0–1%,
    said glass being substantially free of $Al_2O_3$, CdO and PbO.

2. Glass as defined in claim 1 which has Young's modulus of 75 GPa or over.

3. Glass as defined in claim 1 which has Vickers hardness of 550 or over.

4. Glass as defined in claim 1 wherein light transmittance for plate thickness of 10 mm is 90% or over within a wavelength range from 950 nm to 1600 nm.

5. A light filter which is made by forming a dielectric film on glass as defined in claim 1.

6. Glass for a light filter having a coefficient of thermal expansion within a range from $90 \times 10^{-7}/□$ to $120 \times 10^{-7}/°$ C. within a temperature range from −20° C. to +70° C. and having a composition which comprises, in weight percent:
    one or more ingredients selected from the group consisting of $SiO_2$, $B_2O_3$ and $P_2O_5$ in the total amount of 35–55%, wherein the upper limit of $SiO_2$ is 41.5%;
    $TiO_2$ within a range from 0 to 30%;
    $ZrO_2$ within a range from 0 to 5%;
    one or more ingredients selected from the group consisting of MgO, CaO, SrO, BaO and ZnO in the total amount of 3% or more and less than 15%;
    one or more ingredients selected from the group consisting of $Li_2O$, $Na_2O$ and $K_2O$ in the total amount of 5–30%, wherein $Na_2O$ is included within a range from 0 to 14.5% and
    one or both of $Sb_2O_3$ and $As_2O_3$ in the total amount of 0–1%,
    said glass being substantially free of $Al_2O_3$, CdO and PbO.

7. Glass as defined in claim 6 which has Young's modulus of 75 GPa or over.

8. Glass as defined in claim 6 which has Vickers hardness of 550 or over.

9. Glass as defined in claim 6 wherein light transmittance for plate thickness of 10 mm is 90% or over within a wavelength range from 950 nm to 1600 nm.

10. A light filter which is made by forming a dielectric film on glass as defined in claim 6.

11. Glass for a light filter having a coefficient of thermal expansion within a range from $90 \times 10^{-7}/□$ to $120 \times 10^{-7}/°$ C. within a temperature range from −20° C. to +70° C. and having a composition which comprises, in weight percent:

one or more ingredients selected from the group consisting of $SiO_2$, $B_2O_3$ and $P_2O_5$ in the total amount of 35–55%, wherein the upper limit of $SiO_2$ is 41.5%;

one or more ingredients selected from the group consisting of $TiO_2$, $La_2O_3$, $ZrO_2$, $Nb_2O_5$, $Ta_2O_5$, $WO_3$ and $Y_2O_3$ in the total amount of 20–45%, wherein $TiO_2$ is included within a range from 0 to 30%;

one or more ingredients selected from the group consisting of MgO, CaO, SrO, BaO and ZnO in the total amount of 3% or more and less than 15%;

one or more ingredients selected from the group consisting of $Li_2O$, $Na_2O$ and $K_2O$ in the total amount of 5–30%, wherein $Na_2O$ is included within a range from 0 to 14.5%; and one or both of $Sb_2O_3$ and $As_2O_3$ in the total amount of 0–1%.

12. Glass as defined in claim 11 which has Young's modulus of 75 GPa or over.

13. Glass as defined in claim 11 which has Vickers hardness of 550 or over.

14. Glass as defined in claim 11 wherein light transmittance for plate thickness of 10 mm is 90% or over within a wavelength range from 950 nm to 1600 nm.

15. Glass as defined in claim 11 which is substantially free of PbO.

16. A light filter which is made by forming a dielectric film on glass as defined in claim 11.

17. Glass as defined in claim 1 which is free of $B_2O_3$.

* * * * *